US010279292B2

(12) United States Patent
Modena et al.

(10) Patent No.: US 10,279,292 B2
(45) Date of Patent: May 7, 2019

(54) SOLID PARTICULATE CAPTURING DEVICE

(71) Applicant: DONADON SAFETY DISCS AND DEVICES S.R.L., Corbetta (Milan) (IT)

(72) Inventors: Mario Modena, Milan (IT); Antonio Ruggero Sante Donadon, Settimo Milanese (IT); Lauro Bosisio, Milan (IT)

(73) Assignee: DONADON SAFETY DISCS AND DEVICES S.R.L., Corbetta (IT)

( * ) Notice: Subject to any disclaimer, the term of this patent is extended or adjusted under 35 U.S.C. 154(b) by 274 days.

(21) Appl. No.: 15/112,728

(22) PCT Filed: Feb. 20, 2014

(86) PCT No.: PCT/IT2014/000043
§ 371 (c)(1),
(2) Date: Jul. 20, 2016

(87) PCT Pub. No.: WO2015/125163
PCT Pub. Date: Aug. 27, 2015

(65) Prior Publication Data
US 2016/0346720 A1    Dec. 1, 2016

(51) Int. Cl.
*B01D 45/00*    (2006.01)
*B01D 45/08*    (2006.01)
(Continued)

(52) U.S. Cl.
CPC .......... *B01D 45/08* (2013.01); *H01M 2/1205* (2013.01); *H01M 2/127* (2013.01);
(Continued)

(58) Field of Classification Search
CPC  B01D 45/08; H01M 8/04805; H01M 2/1294; H01M 2/127; H01M 2/1241;
(Continued)

(56) References Cited

U.S. PATENT DOCUMENTS 6,101,886 A * 8/2000 Brenizer ................ B01D 45/08
55/308
6,290,738 B1 * 9/2001 Holm ...................... B01D 45/08
55/309

(Continued)

FOREIGN PATENT DOCUMENTS

DE    38 26 477 A1    2/1990
EP    1 291 496 A1    3/2003
EP    1 598 883 A1    11/2005

*Primary Examiner* — Dung H Bui
(74) *Attorney, Agent, or Firm* — Pearne & Gordon LLP

(57) ABSTRACT

A solid particulate capturing device comprises a first plate (2) having at least one inlet section (6) for an exhaust gas flow, a second plate (3), parallel to the first (2), having at least one outlet section (7) for the exhaust gas flow. The first (2) and the second plate (3) are axially spaced apart and form, with an annular lateral wall (4), interposed between the first (2) and the second plate (3), an entrapment chamber (5) for solid particulate conveyed in suspension in the exhaust gas flow produced by a battery. The outlet section (7) present on the second plate (3) is axially out of alignment with the inlet section (6) present on the first plate (2), in such a way that the inlet section (6) faces a solid portion (8) of the second plate (3) which acts as an obstructing surface for the solid particulate.

16 Claims, 4 Drawing Sheets

(51) Int. Cl.
  *H01M 2/12*    (2006.01)
  *H01M 8/04791* (2016.01)
(52) U.S. Cl.
  CPC ....... *H01M 2/1241* (2013.01); *H01M 2/1264* (2013.01); *H01M 2/1294* (2013.01); *H01M 8/04805* (2013.01); *H01M 2200/20* (2013.01); *H01M 2250/20* (2013.01); *Y02T 90/32* (2013.01)
(58) Field of Classification Search
  CPC ............. H01M 2/1205; H01M 2/1264; H01M 2250/20; H01M 2200/20; Y02T 90/32
  See application file for complete search history.

(56) References Cited

U.S. PATENT DOCUMENTS

| | | | |
|---|---|---|---|
| 2003/0047074 A1 | 3/2003 | Liu et al. | |
| 2012/0159912 A1* | 6/2012 | Ruppel | B01D 45/08 55/462 |
| 2012/0295140 A1 | 11/2012 | Cho et al. | |
| 2014/0059985 A1* | 3/2014 | Janakirannan | B01D 45/08 55/459.4 |

* cited by examiner

SOLID PARTICULATE CAPTURING DEVICE

TECHNICAL FIELD

The present invention relates to a solid particulate capturing device and a safety apparatus comprising said device.

In particular, the present invention finds specific application in association with high discharge voltage electric accumulators so as to ensure the safety of the system.

STATE OF THE ART

It is observed, in fact, that these high discharge voltage electric accumulators, such as for example batteries for hybrid electric vehicles, can produce and release flammable gases.

Exhaust gases produced by these accumulators can generate pressures or overpressures greater than the resistance of the apparatus and must therefore be discharged at a safety pressure.

In this connection, it is indispensable that there should be a safe apparatus to protect equipment or systems, and that it should be capable of ducting said gases to the outside, thus avoiding damage to the equipment.

The gases developed, furthermore, may be flammable and catch fire once outside. To avoid this flame being able to propagate backwards, towards the inside, it is necessary to fit a flame trap at the outlet.

For this reason, these safety apparatuses comprise, in addition to an element with a preset fracture point which protects the equipment from overpressure, also at least one element suitable for preventing flashbacks, in view of the flammable nature of the gases emitted.

Notwithstanding these safety elements, it is observed that similar safety apparatuses are subject to failure due to overloading of the flame trap element.

In fact, it is found that such gas contains solid or semi-solid particles which are conveyed outwards with the gas flow, and tend to be deposited on the flame trap, reducing its venting capacity.

OBJECT OF THE INVENTION

An object of the present invention is to create a solid particulate capturing device capable of intercepting and retaining the solid or semi-solid particles, preventing them from being carried with the gases produced by the high discharge voltage accumulator.

A further object of the present invention is to propose a safety apparatus for high discharge voltage electrical accumulators capable of allowing safe venting of flammable gases, avoiding rupture of the plant due to overpressure, preventing flashbacks and maintaining the efficiency of the flame trap element for a sufficient time to overcome the fault.

These and other objects are substantially achieved by a solid particulate capturing device and by a safety apparatus for high discharge voltage electrical accumulators according to what is described in one or more of the attached claims.

Further characteristics and advantages of the present invention will become clearer from the detailed description of a preferred and not exclusive embodiment of a solid particulate capturing device and of a safety apparatus for high discharge voltage electrical accumulators in accordance with the present invention.

BRIEF DESCRIPTION OF THE DRAWINGS

This description is provided with reference to the attached drawings, these too having a purely exemplary and therefore non-limiting purpose, in which.

DETAILED DESCRIPTION OF PREFERRED EMBODIMENTS OF THE INVENTION

In accordance with the present drawings, reference number 1 indicates a solid particulate capturing device in accordance with the present invention. This device 1 has the outlet gas flow from a high discharge voltage electrical accumulator passing through it following a fault, and intercepts the solid particulate present in suspension in the gas flow.

Figure 3:
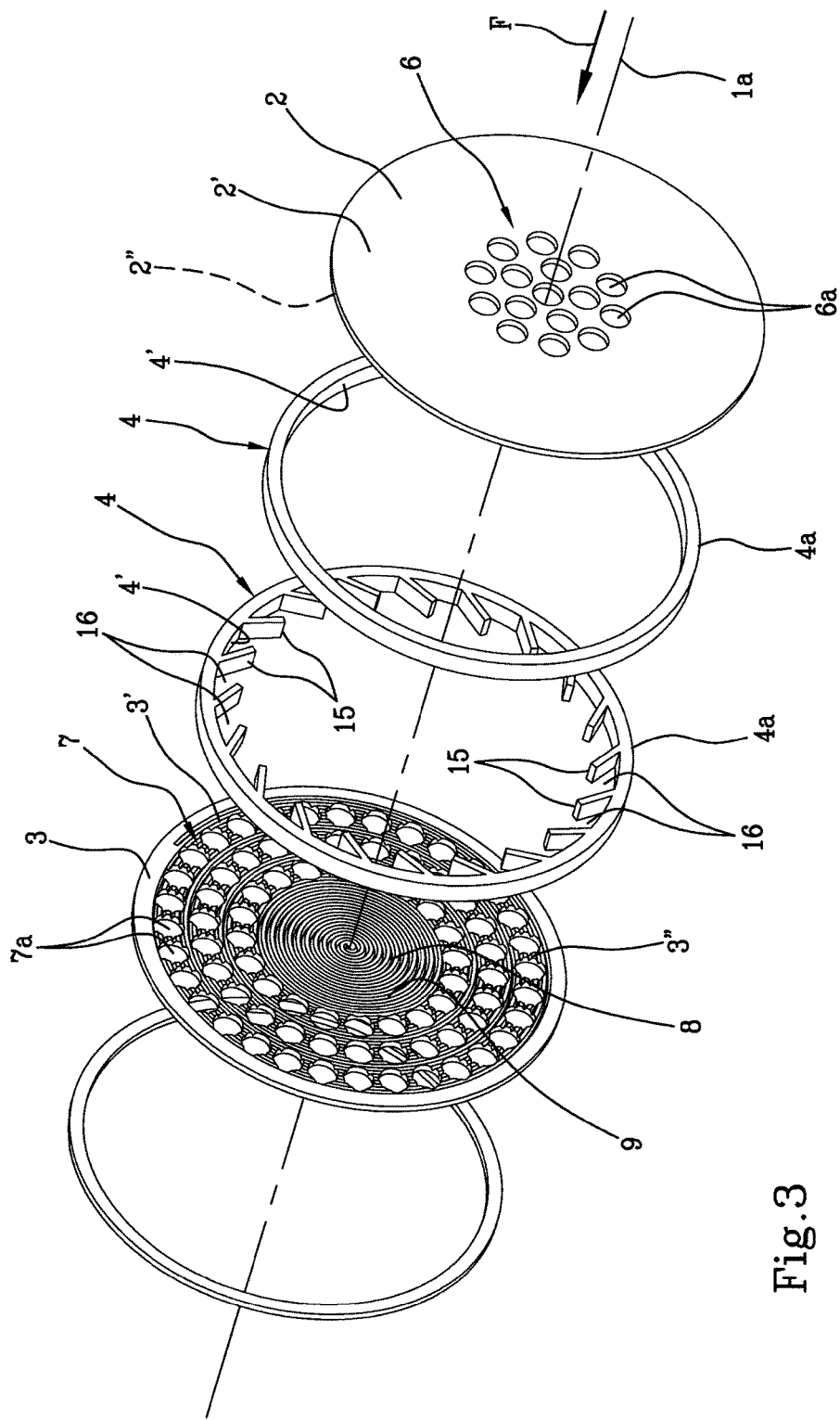
FIG. 3 is an exploded schematic perspective view of a solid particulate capturing device in accordance with the present invention.
Figure 4:
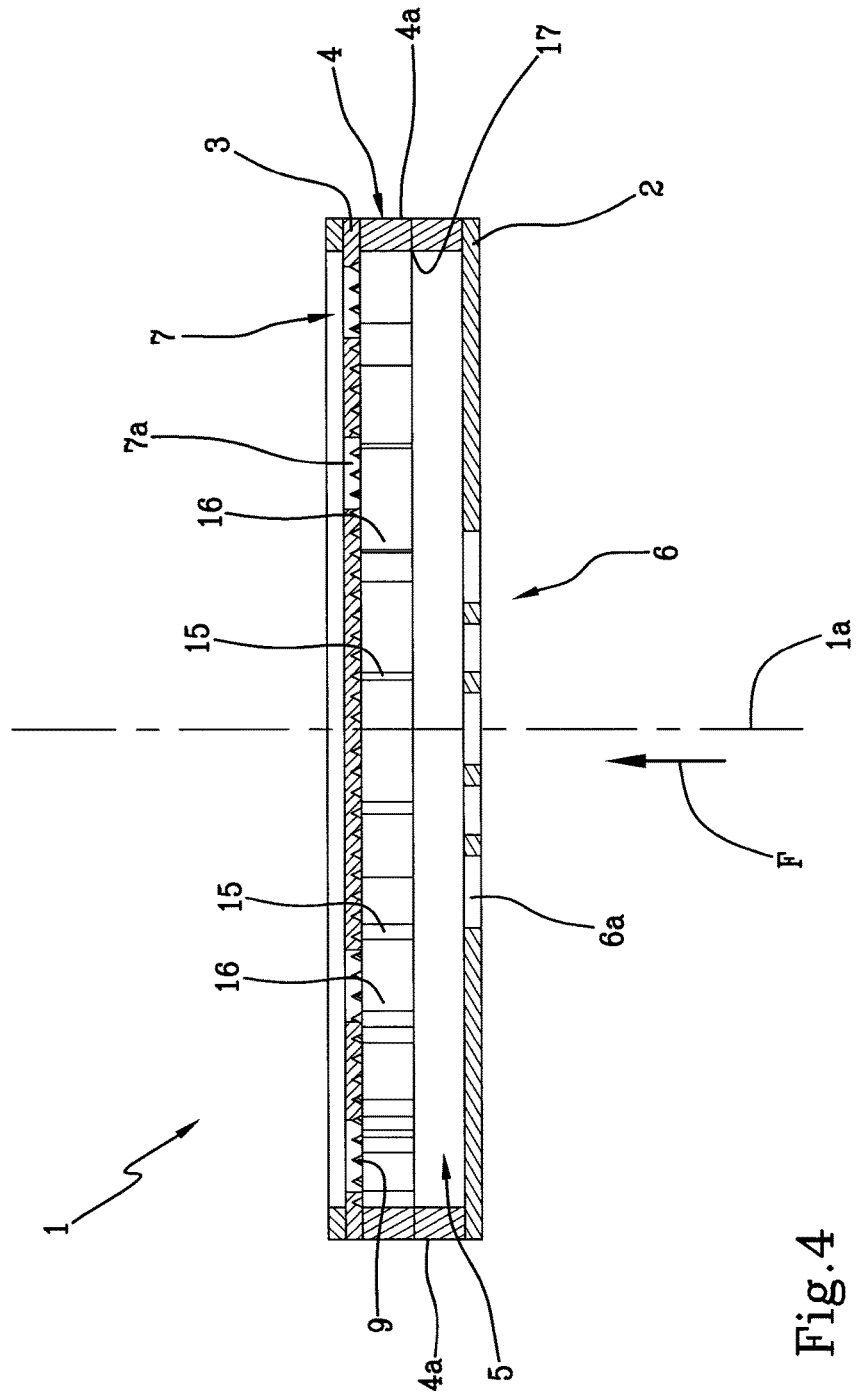
FIG. 4 is a sectioned side view of the solid particulate capturing device illustrated in FIG. 3.

The solid particulate capturing device 1 (FIGS. 3 and 4) comprises at least one first plate 2 and at least one second plate 3, axially spaced apart and delimiting, with an annular lateral wall 4 interposed between them, an entrapment chamber 5 (FIG. 4).

In an illustrated form, preferred but not exclusive, the first plate 2 and the second plate 3 have a circular shape and are parallel to each other. The plates, however, can be of square, rectangular or polygonal shape, or take any other shape, such as for example star shape; they can also be not parallel to each other.

The annular lateral wall 4 can be made with a single body or by connecting together, by superimposition, two or more shaped rings 4a, as may be seen in FIG. 3.

The first plate 2 has at least one inlet section 6 for an exhaust gas flow and the second plate 3 has at least one outlet section 7 for said exhaust gas flow.

Advantageously, the outlet section 7, present on the second plate 3, is axially out of alignment with the inlet section 6, present on the first plate 2, in such a way that the latter faces a solid surface portion 8 of the second plate 3, which acts as a barrier, as an obstructing surface for the solid particulate conveyed in suspension with the gas flow.

Both the inlet section 6 and the outlet section 7 have a plurality of through holes 6a and 7a.

In particular, the through holes 6a of the inlet section 6 are arranged coaxially around an axis 1a of symmetry common to the first plate 2 and the second plate 3. In other words, the through holes 6a of the inlet section 6 are preferably extended over a circular area around the axis of symmetry 1a.

The holes 7a in the outlet section 7 extend over an area of the second plate 3 in the shape of a circular crown.

Preferably, the circular area over which the inlet section 6, and therefore the through holes 6a extend, is complementary to the area in the shape of a circular crown along which the outlet section 7 and the respective holes 7a extend. In other words, the inlet section 6 occupies a surface of the first plate 2 having an extension equal to or less than the surface of the second plate 3, being delimited and confined within the circular crown occupied by the outlet section 7 on the second plate 3.

Advantageously, the holes 6a of the inlet section 6 are never in correspondence and axially aligned with the holes 7a in the outlet section, in such a way that the exhaust gas flow cannot, when passing through device 1, travel a straight trajectory but is forced to deviate along a tortuous route, impacting both against an internal surface 4' of the annular lateral wall 4, and against a solid surface 8 of the second plate 3 which offers an obstruction and which blocks the solid or semi-solid residues conveyed by the gas flow, trapping them in the entrapment chamber 5.

Advantageously, the surface occupied by the inlet section 6 is equal to 30-60% of the area occupied by the first plate 2.

Similarly, the surface occupied by the outlet section 7 is equal to 40-70% of the area occupied by the second plate 3.

Each hole 6a, 7a preferably has a diameter comprised between 0.6 and 3 mm, therefore each hole has an area variable between 0.28 and 7 mm$^2$. To ensure a good outflow of exhaust gases, it is preferable that the sum of the areas of the holes 6a in the inlet section 6 should be equal to 30-60% of the surface of the first plate 2, and the sum of the areas of the holes 7a in the outlet section 7 should be equal to 40-70% of the surface of the second plate 3

The solid particulate capturing device 1 can also comprise more than two plates 2, 3 mutually facing each other, arranged in sequence and axially spaced apart, each having a plurality of through holes out of alignment with each other, through which the gas flow must pass.

This makes the path of the gas flow even more tortuous, increasing the obstructive action on the solid particulate.

Whether in the presence of only two plates or in the presence of three or more plates, it is essential that the contiguous and mutually facing plates should have holes axially out of alignment with each other.

The entrapment action on the solid or semi-solid residues exercised by the device 1 is further augmented by the presence of at least one corrugated surface on at least one of the two plates 2 and 3.

Advantageously, at least one of the plates 2, 3 has a variation in superficial roughness on the corresponding surface 2', 3' facing in the contrary direction to the direction of advance of the gas flow F and/or at least on the corresponding surfaces 2", 3" facing towards the inside of the entrapment chamber 5. In the case of the second plate 3, the surfaces 3' and 3" coincide. In the attached drawings, a single corrugated surface has been indicated for purely exemplary purposes, in particular the surface 3" of the second plate 3 facing towards the entrapment chamber 5.

In addition, the inner surface 4' of the annular lateral wall 4 can also feature variation in the superficial roughness.

The surfaces of plates 2, 3, both those inside the entrapment chamber 5 and those outside, and the inner surface 4' of the annular lateral wall 4 can therefore have continuous and extensive irregularities, such as a plurality of furrows or incisions 9, or irregularities that are not continuous and discrete, such as cavities, small grooves, depressions or projections.

To exercise an effective entrapment action, it is preferable that each furrow 9 should have a 'V' shape with a maximum width comprised between 0.1 and 0.5 mm and a depth comprised between 0.2 and 1 mm. Advantageously, the furrows 9 are made by laser machining which produces depressions and peaks which give the surface a more effective output, besides being arranged in the most effective way.

Non-continuous irregularities, too, can advantageously be produced by laser technology.

The inner surface 4' of the annular lateral wall 4 can have non-continuous and discrete irregularities such as a plurality of fins 15, which project towards the inside of the entrapment chamber 5 (FIG. 3), to create loops 16 within which the solid particulate can remain trapped.

Alternatively, in the event that the annular lateral wall 4 is formed by the superimposition of two or more shaped rings 4a, it is possible to create, along the superimposition surface of the rings 4a, a plurality of annular grooves 17 (FIG. 4), inside which the solid or semi-solid particulate can be deposited and held.

The capturing device 1, according to the present invention, is made of metallic material, resistant to corrosion, chemically inert to hydrogen and thermically resistant to expansion.

A device of this kind finds particular and advantageous application inside a safety apparatus 10 for high discharge voltage electrical accumulators.

Specifically, the device hitherto described is integrated into safety apparatuses 10 for batteries for motor vehicles, particularly inside batteries for hybrid vehicles.

The battery, also called an accumulator, is a device which stores electricity for later delivery when it is required. The energy is stored using reversible chemical reactions which release or absorb electrons depending on whether the battery is delivering current or is being recharged. The storage of energy is necessary for starting the engine and supplying the electrical system and all the connected devices, from the lights to the engine management unit, the electrical servo controls and, in hybrid vehicles, traction.

Figure 1:
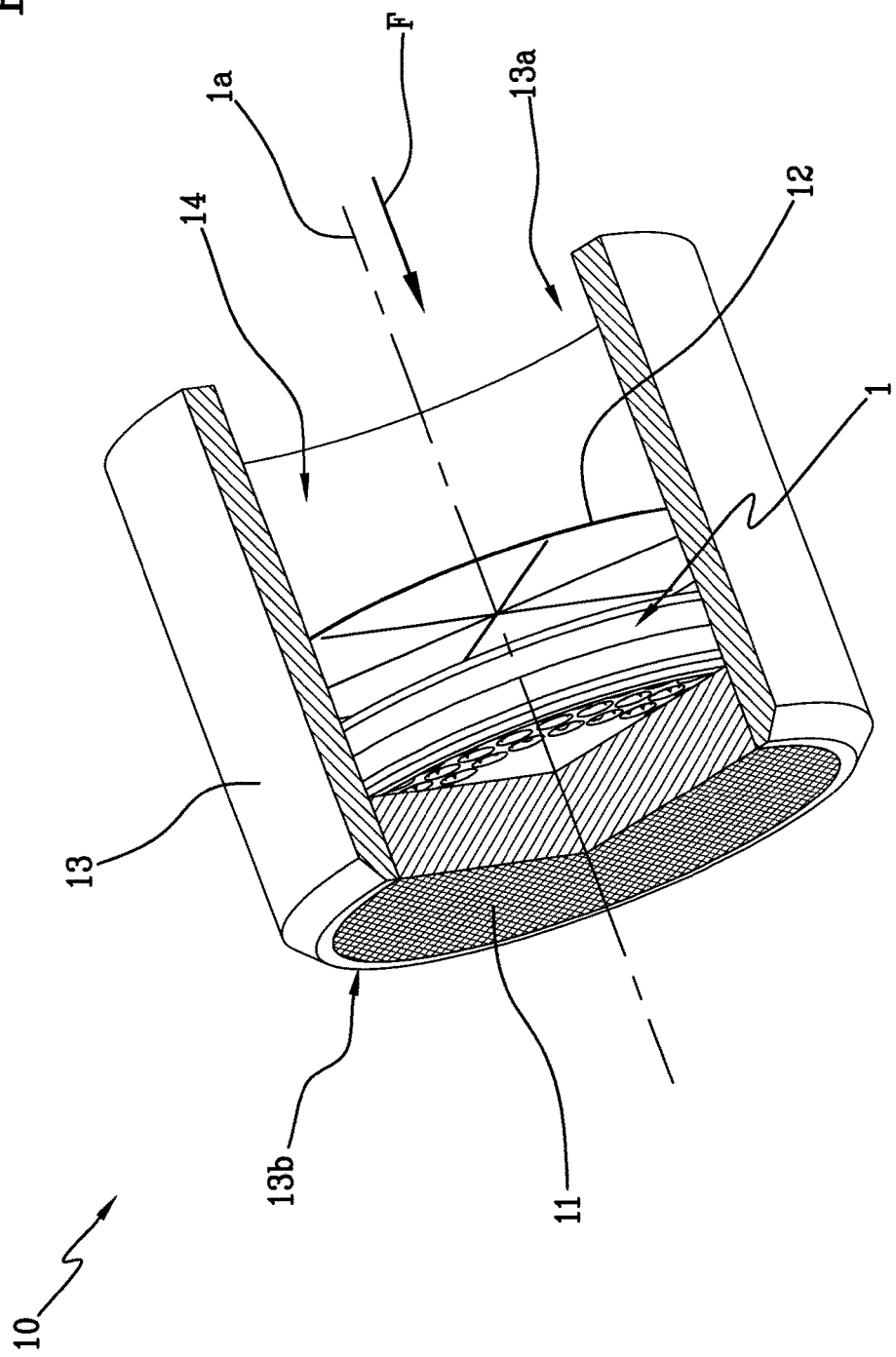
FIG. 1 is a perspective and partially sectioned view of a safety apparatus for high discharge voltage electrical accumulators in accordance with the present invention.
Figure 2:
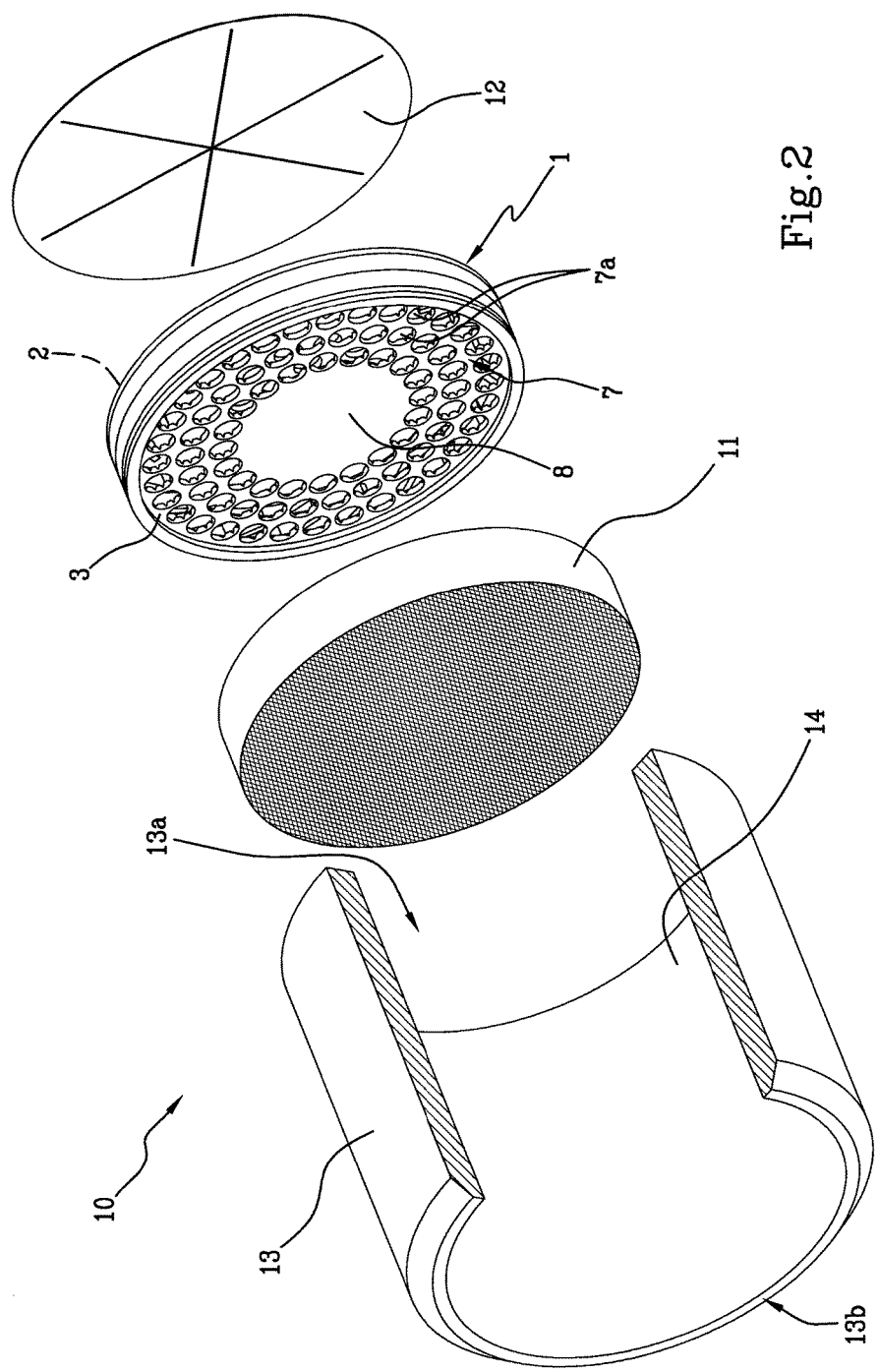
FIG. 2 is a schematic perspective view, partially exploded, of the safety apparatus illustrated in FIG. 1.

The batteries are equipped with safety apparatuses 10 (FIGS. 1 and 2), which are responsible for ducting the gases, and flame trap bodies 11 which ensure that the gas escapes safely, preventing flashbacks to the inside of the battery.

Inside these accumulators, overpressures can be generated which must be controlled by means of suitable safety elements 12 with a preset fracture point.

Flame trap bodies 11 (FIGS. 1 and 2) offer a high degree of safety against explosions caused by flashbacks and are positioned at the outlet of the safety apparatus 10. In fact, gases can escape in the vicinity of potentially hot points such as parts of the engine, exhausts or brakes.

Elements providing protection from overpressure, such as elements with preset fracture points 12, are advantageously placed upstream of the flame trap bodies 11 and comprise safety discs with preset rupture points, therefore calibrated on the basis of the pressure level which they must resist.

The safety apparatus 10 for high discharge voltage electrical accumulators therefore comprises a casing 13, preferably cylindrical, having inside it a ducting chamber 14 for exhaust gases.

The ducting chamber 14 is formed in an initial portion of the safety apparatus 10, communicating with the surrounding environment by means of a first open end 13a of the casing 13. This open end 13a serves for coupling the safety apparatus 10 with a high discharge voltage accumulator.

At the back of the ducting chamber there is the element with a preset fracture point 12, while at the second end 13b of the cylindrical casing 13, opposite to the first 13a, there is the flame trap body 11.

It has been found that the gases developed by such accumulators, besides being flammable, have solid or semi-solid particles in suspension.

It is therefore useful to install along the outlet path of the gas, before the flame trap body 11, at least one solid particulate capturing device 1, with the object of reducing or retarding the overloading of the flame trap body 11. Preferably, several capturing devices 1 in series can be provided.

Advantageously, this capturing device 1 is interposed between the element with a preset fracture point 12 and the flame trap body 11.

In other words, bearing in mind the direction of advancement of the gas flow F, the element with a preset fracture point 12 is placed upstream of the capturing device 1, while the flame trap body 11 is positioned downstream thereof.

The present invention achieves the proposed objects since it successfully proposes a capturing device capable of retaining and imprisoning within it the solid particulate present in suspension in the gases released by the electrical accumulator.

The two discs facing each other with holes out of alignment are able to create a barrier which blocks the solid particulate, preventing it from escaping.

The presence of furrows further improves the action of entrapping the solid and semi-solid particles.

The capturing device, thus integrated into the inside of a safety apparatus for high discharge voltage electrical accumulators, makes the latter even more effective, since it prevents the flame trap body, which is indispensable for preventing battery explosions, from becoming overloaded and putting at risk the safety of the vehicle and its occupants for the entire duration of the fault.

The invention claimed is:

1. A safety apparatus (10) for high discharge voltage electrical accumulators comprising:
   a containment casing (13);
   an exhaust gas ducting chamber (14), located in proximity to a first open end (13a) of said containment casing (13);
   an element with a preset fracture point (12) for overpressures, located at the back of the ducting chamber (14);
   a flame trap body (11) located in proximity to a second end (13b) of the containment casing (13), downstream of the element with preset fracture point (12) according to a direction of advancement of a gas flow (F);
   wherein between said element (12) with a preset fracture point and said flame trap body (11) there is at least one solid particulate capturing device (1), said solid particulate capturing device (1) comprising a first plate (2) having at least one inlet section (6) for an exhaust gas flow, a second plate (3), having at least one outlet section (7) for said exhaust gas flow; said first plate (2) and said second plate (3) being axially distanced and forming, with an annular lateral wall (4), axially interposed between them and coaxial with them, an entrapment chamber (5) for said solid particulate; said outlet section (7) on said second plate (3) being axially out of alignment with the inlet section (6) on said first plate (2), in such a way that said inlet section (6) faces a solid portion (8) of said second plate (3) which acts as an obstructing surface for said solid particulate, wherein at least one surface of said first plate (2) and/or said second plate (3) are corrugated and have a plurality of continuous and extensive irregularities (9), comprising a plurality of furrows or incisions, or discrete irregularities, comprising cavities or small grooves or depressions or projections, and wherein an inner surface (4') of the annular lateral wall (4) has non-continuous and discrete irregularities, comprising as a plurality of fins (15), which project towards the center of the entrapment chamber (5), inclined with respect to the inner surface (4') of the annular lateral wall (4), to create loops (16) within which the solid particulate can remain trapped.

2. The safety apparatus according to claim 1, wherein said safety apparatus comprises a plurality of said solid particulate capturing devices (1), arranged in series.

3. A method of using a safety apparatus according to claim 1, comprising a step of disposing said solid particulate capturing device in communication with a battery of an electric motor so as to receive an exhaust gas from said battery.

4. The safety apparatus according to claim 1, wherein said inlet section (6) comprises a plurality of through holes (6a) arranged coaxially around an axis (1a) of symmetry common to said first plate (2) and said second plate (3).

5. The safety apparatus according to claim 1, wherein said inlet section (6) occupies a surface of said first plate (2) equal to or less than the surface of the second plate (3), delimited and confined inside the circular crown occupied by the outlet section on said second plate (3).

6. The safety apparatus according to claim 1, wherein at least one internal surface of said annular lateral wall (4) is corrugated and has a plurality of continuous (9) irregularities.

7. The safety apparatus according to claim 1, wherein said annular lateral wall (4) comprises a plurality of superimposed shaped rings (4a).

8. The safety apparatus according to claim 1, wherein each furrow (9) or cavity has a width comprised between 0.1 mm and 0.5 mm and a depth comprised between 0.2 mm and 1 mm; said furrows (9) being created by laser technology.

9. The safety apparatus according to claim 1, wherein the solid particulate capturing device (1) is made of metallic material, resistant to corrosion, chemically inert to hydrogen and thermically resistant to expansion.

10. The safety apparatus according to claim 1, wherein said safety apparatus comprises a plurality of said solid particulate capturing devices (1).

11. The safety apparatus according to claim 1, wherein said outlet section (7) has a plurality of through holes (7a) arranged to form a circular crown on said second plate (3).

12. The safety apparatus according to claim 11, wherein a surface occupied by the inlet section (6) has an extension variable between 30% and 60% of a surface of the first plate (2).

13. The safety apparatus according to claim 11, wherein a surface occupied by the outlet section (7) has an extension variable between 40% and 70% of a surface of the second plate (3).

14. The safety apparatus according to claim 11, wherein each hole (6a, 7a) has a diameter variable between 0.6 mm and 3 mm.

15. The safety apparatus according to claim 14, wherein a sum of the sections of the holes (6a) in the inlet section (6) is comprised between 30% and 60% of the surface of said first plate (2).

16. The safety apparatus according to claim 14, wherein a sum of the sections of the holes (7a) in the outlet section (7) is comprised between 40% and 70% of the surface of said second plate (3).

* * * * *